(12) United States Patent
Janssen

(10) Patent No.: US 11,060,913 B2
(45) Date of Patent: Jul. 13, 2021

(54) TUNEABLE FILTER

(71) Applicant: Lumentum Technology UK Limited, Towcester (GB)

(72) Inventor: Adrian Perrin Janssen, Devon (GB)

(73) Assignee: Lumentum Technology UK Limited, Northamptonshire (GB)

( * ) Notice: Subject to any disclaimer, the term of this patent is extended or adjusted under 35 U.S.C. 154(b) by 0 days.

(21) Appl. No.: 16/620,305

(22) PCT Filed: Jun. 11, 2018

(86) PCT No.: PCT/GB2018/051586
§ 371 (c)(1),
(2) Date: Dec. 6, 2019

(87) PCT Pub. No.: WO2018/229467
PCT Pub. Date: Dec. 20, 2018

(65) Prior Publication Data
US 2020/0191653 A1    Jun. 18, 2020

(30) Foreign Application Priority Data
Jun. 13, 2017 (GB) .................... 1709382

(51) Int. Cl.
*G01J 3/26* (2006.01)
*G01J 3/02* (2006.01)
(Continued)

(52) U.S. Cl.
CPC ............. *G01J 3/26* (2013.01); *G01J 3/0286* (2013.01); *G02B 5/284* (2013.01); *G02B 7/006* (2013.01);
(Continued)

(58) Field of Classification Search
None
See application file for complete search history.

(56) References Cited

U.S. PATENT DOCUMENTS 3,697,182 A    10/1972    Allen et al.
5,212,745 A    5/1993    Miller
(Continued)

FOREIGN PATENT DOCUMENTS

CN    201364435 Y    12/2009
CN    102411245 A    4/2012
(Continued)

OTHER PUBLICATIONS

Anonymous, "Kapton Heaters," XP055510955, Retrieved on May 9, 2017 from https://web.archive.org/web/20170509212428/http://www.omega.com:80/pptst/KHR_KHLV_KH.html.
(Continued)

*Primary Examiner* — Shawn Decenzo
(74) *Attorney, Agent, or Firm* — Harrity & Harrity, LLP

(57) ABSTRACT

According to a first aspect of the present invention, there is provided an optical filter. The optical filter comprises first and second optical elements, and one or more expansion elements. The first and second optical elements are arranged along a common axis, each terminates in a flat surface perpendicular to the axis. The flat surfaces are separated by a gap having a width d, such that the flat surfaces form a Fabry-Perot etalon and light is transmittable along an optical path through the elements and the etalon. The one or more expansion elements are connected to the optical elements, located outside the optical path and extend parallel to the axis with a length greater than the width of the gap. The expansion elements comprise a material having a linear thermal coefficient of expansion different to that of the optical elements such that a difference in expansion of the expansion elements and the optical elements causes relative movement of the flat surfaces along the axis resulting in a change in the width of the gap.

20 Claims, 6 Drawing Sheets

(51) Int. Cl.
*G02B 5/28* (2006.01)
*G02B 7/00* (2021.01)
*G02B 6/293* (2006.01)
*G02B 26/00* (2006.01)

(52) U.S. Cl.
CPC ........ *G02B 6/29395* (2013.01); *G02B 26/001* (2013.01)

(56) References Cited

U.S. PATENT DOCUMENTS

| | | | | |
|---|---|---|---|---|
| 5,212,746 A | * | 5/1993 | Miller | G02B 6/241 |
| | | | | 385/25 |
| 5,232,962 A | | 8/1993 | Dershem et al. | |
| 6,285,504 B1 | * | 9/2001 | Diemeer | G02B 6/122 |
| | | | | 359/578 |
| 2002/0172239 A1 | * | 11/2002 | McDonald | H01S 5/141 |
| | | | | 372/20 |
| 2006/0280512 A1 | * | 12/2006 | Sato | G02B 6/29362 |
| | | | | 398/212 |
| 2014/0362442 A1 | * | 12/2014 | Chen | G02B 6/29395 |
| | | | | 359/579 |
| 2020/0033518 A1 | * | 1/2020 | Sakurai | G02B 6/12 |

FOREIGN PATENT DOCUMENTS

| | | |
|---|---|---|
| DE | 2756500 A1 | 6/1979 |
| EP | 0629886 A1 | 12/1994 |
| EP | 11456325 A2 | 10/2001 |

OTHER PUBLICATIONS

Feb. 5, 2019 International Search Report and Written Opinion issued in PCT/GB2018/051586, 19 pages.

* cited by examiner

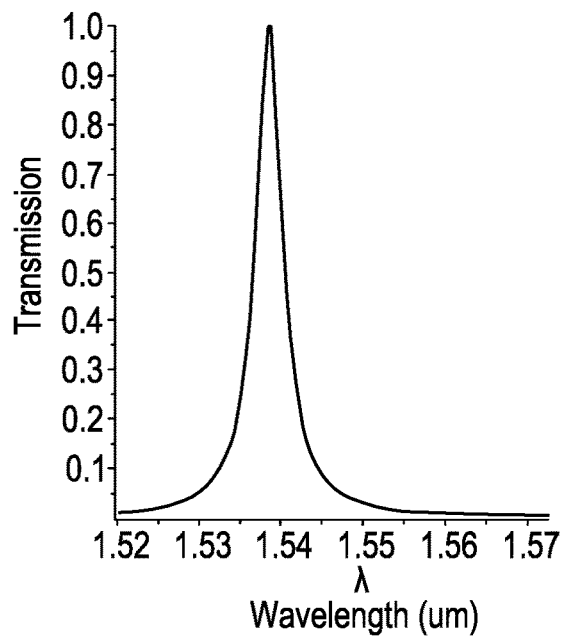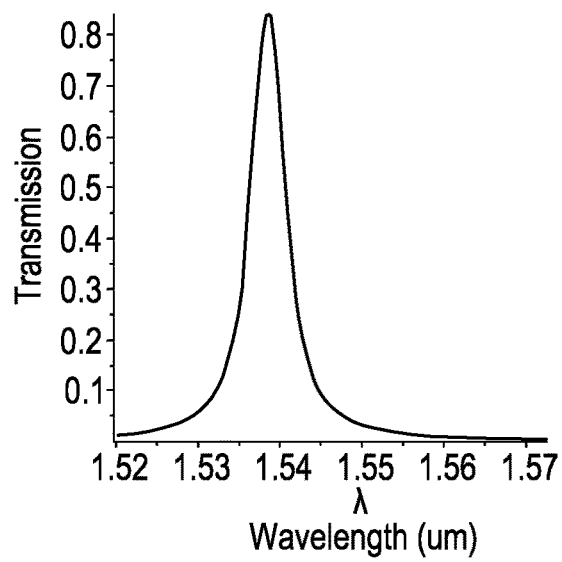
Figure 5A
Figure 5B
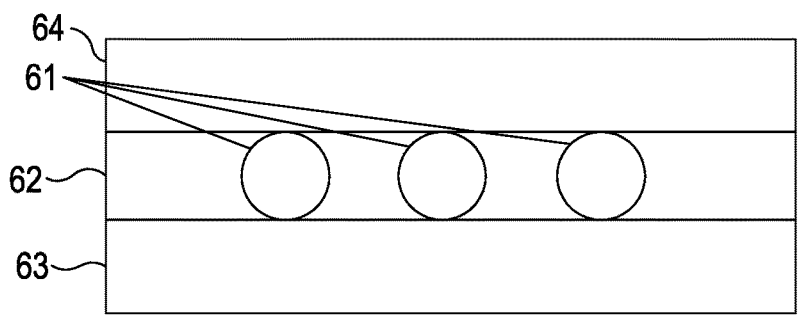
Figure 6
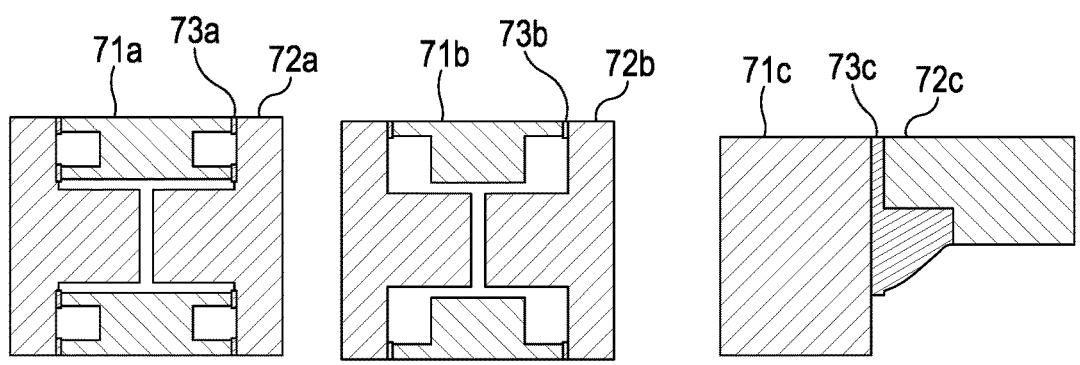
Figure 7A
Figure 7B
Figure 7C

TUNEABLE FILTER

CROSS-REFERENCE TO RELATED APPLICATIONS

This application is a 371 national stage of PCT Application No. PCT/GB2018/051586, filed on Jun. 11, 2018 and entitled "TUNEABLE FILTER," which claims priority to United Kingdom Patent Application No. 1709382.4, filed on Jun. 13, 2017 and entitled "TUNEABLE FILTER," which are incorporated by reference herein.

FIELD OF THE INVENTION

The present invention relates to a filter for use in an optical system. In particular, it relates to a filter for which the wavelength of peak transmission is thermally tuneable.

Index of Terms in Equations (unless otherwise specified in the description of the equation)

T—Temperature
$\alpha$—Linear coefficient of thermal expansion (LCE)
n—Refractive index
$\psi$—Thermo-optic coefficient
q—Thermal path length sensitivity, $q=n\alpha+\psi$
L—length of expansion element
C—length of cylinder
$X_0$— value of "X" at a reference temperature ($T_0$ is the reference temperature)
$\Delta X$—change in X, measured from $X_0$

BACKGROUND

Fibre optic communications use lasers to generate optical signals within narrow wavelength bands. A single fibre optic cable may carry information in various different bands (and/or different channels within a band). It is therefore important to reduce the noise generated in other bands when transmitting a signal in a target band.

In order to achieve this, the output of a laser/modulator system can be passed through a filter configured to select only the target frequency. One optical component which can act as a filter for this purpose is a Fabry-Perot (FP) etalon (or interferometer). An FP etalon is illustrated in FIG. 1A, and comprises a transparent plate with two reflecting surfaces. As the light bounces between the surfaces, the transmitted rays interfere with each other, producing a characteristic interference pattern, which is dependent upon the frequency and the optical distance between the plates.

The frequency response of a FP etalon has the characteristic curve shown in FIG. 1B. As can be seen, for a high-finesse FP etalon (i.e. one with a sharp peak), the losses for frequencies other than the target frequency are significant, and even slight deviations from the target frequency can be filtered out.

An FP etalon is suitable for use where a component emits light at a constant frequency—but in some applications it is desirable for a component to be adjustable so as to transmit on different frequencies, e.g. on each channel within a band. The frequency response of the FP etalon depends on the optical distance between the plates, so current adjustable FP etalons take advantage of this by having a material between the plates with a large variation of optical distance with temperature (i.e. a large thermal path length sensitivity q, where $q=n\alpha+\psi$). The optical distance and therefore frequency response of the etalon is therefore adjustable by adjustment of the temperature of the etalon.

However, for a filter to work adequately within a band, it must have a large enough free spectral range (FSR) that there is only a single peak within the band (i.e. the frequency response curve always slopes away from the peak within the band). Otherwise, higher order peaks of the frequency response curve can permit noise to enter the fibre. The FSR is inversely proportional to the optical distance between the mirrors of the etalon, so to obtain a large spectral range the optical distance between the mirrors must be small (e.g. approx 30 microns of air for the C-band).

Using a small distance between the mirrors means temperature changes in the material between the mirrors will cause only small changes to the inter-mirror optical distance. In practice, for the C-band, where silicon is used as the inter-mirror material, the variation in thickness cannot cover the band within a reasonable temperature range (e.g. 20° C. to 100° C.) at a satisfactory FSR.

Whole-band solutions are available using multiple silicon-based tuneable filters, where each filter has an FSR smaller than the band. The filters are calibrated such that only one peak overlaps on all filters at any particular setting and the overlapping peak can be adjusted by varying the temperature of each filter individually to control the selected frequency. However, such systems require extreme precision in manufacture, calibration, and control, and still result in high losses compared to single filter systems.

There is a need for a tuneable filter capable of operating over an entire band with high FSR and low losses.

SUMMARY

According to a first aspect of the present invention, there is provided an optical filter. The optical filter comprises first and second optical elements, and one or more expansion elements. The first and second optical elements are arranged along a common axis, each terminating in a flat surface perpendicular to the axis. The flat surfaces are separated by a gap having a width d, such that the flat surfaces form a Fabry-Perot etalon and light is transmittable along an optical path through the elements and the etalon. The one or more expansion elements are directly or indirectly connected to the optical elements, located outside the optical path and extending parallel to the axis with a length greater than the width of the gap. The expansion elements comprise a material having a linear thermal coefficient of expansion different to that of the optical elements such that a difference in expansion of the expansion elements and the optical elements causes relative movement of the flat surfaces along the axis resulting in a change in the width of the gap.

According to a further aspect, there is provided an optical device comprising a modulator and an optical filter according to the previous aspect, wherein the optical filter is arranged to receive an output beam of the modulator.

Further aspects and preferred features are set out in claim 2 et seq.

BRIEF DESCRIPTION OF THE DRAWINGS

FIG. 5A is a graph of transmission for a perfectly aligned etalon;

FIG. 5B is a graph of transmission for a misaligned etalon;

FIG. 6 shows an exemplary join between elements of an optical filter;

FIGS. 7A, B and C show further exemplary constructions of an optical filter;

DETAILED DESCRIPTION

As noted in the background, previous tuneable etalons have used a thermal expansion material in the inter-mirror space to adjust the inter-mirror optical distance, d, of the etalon. However, this results in a compromise between the FSR of the etalon and the range of tuning which is possible. Instead, a design is proposed below where the thermal expansion material is provided outside the optical path, and used to vary the width of an air gap between the mirrors. This allows the use of a wider range of thermal expansion materials (i.e. it does not need to be transparent), and allows a considerably greater temperature sensitivity for the device (or equivalently, a considerably greater range of frequency for a given temperature range).

Figure 1A:
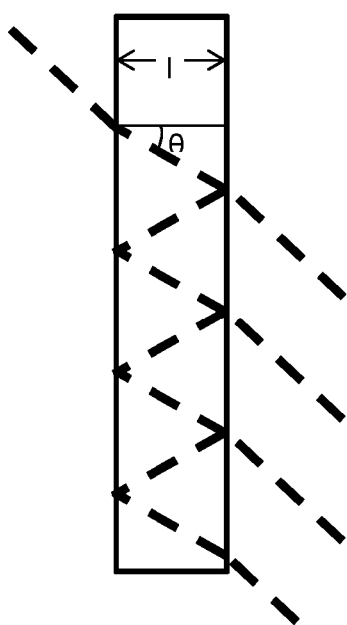
FIG. 1A is a schematic diagram of an etalon.
Figure 1B:
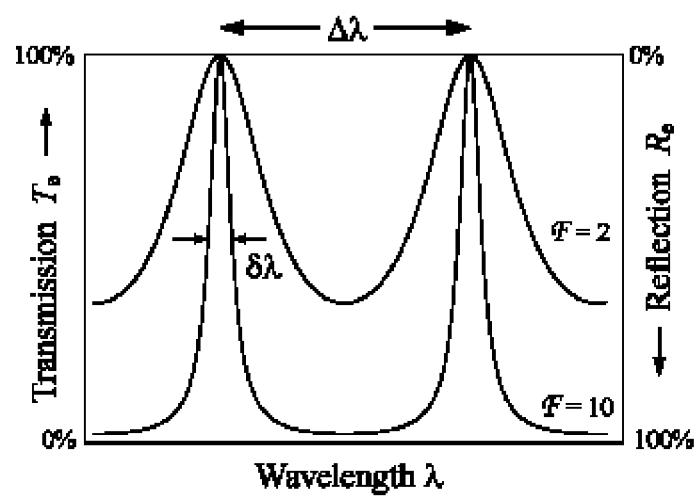
FIG. 1B shows the frequency response curve of an etalon.
Figure 2A:
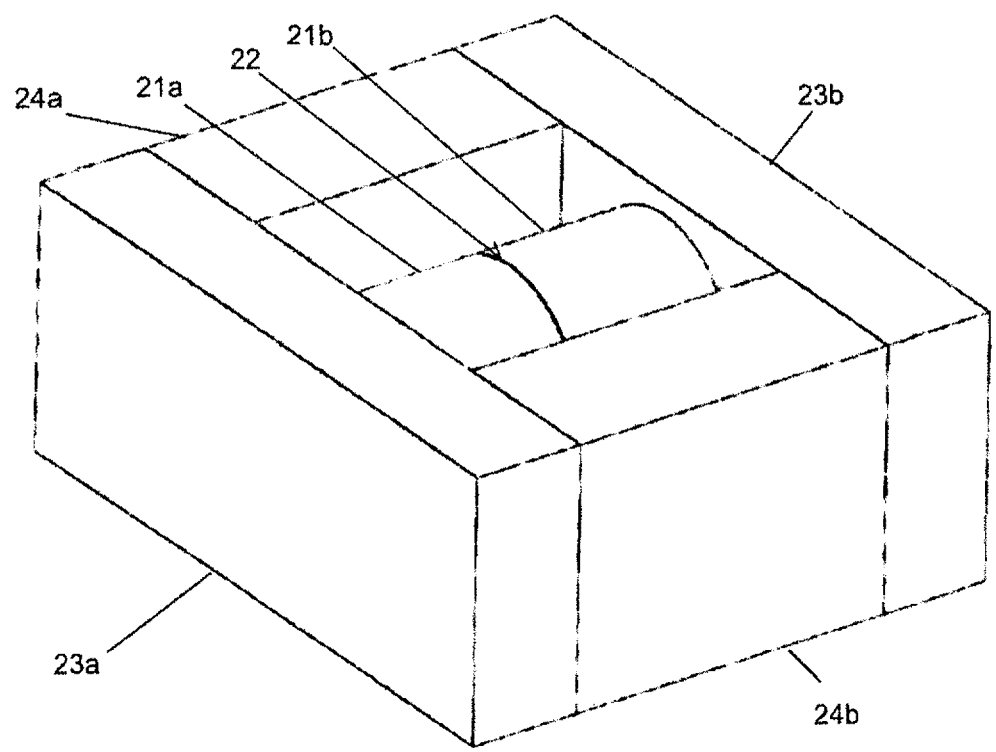
FIGS. 2A and 2B show an exemplary construction for an optical filter.
Figure 2B:
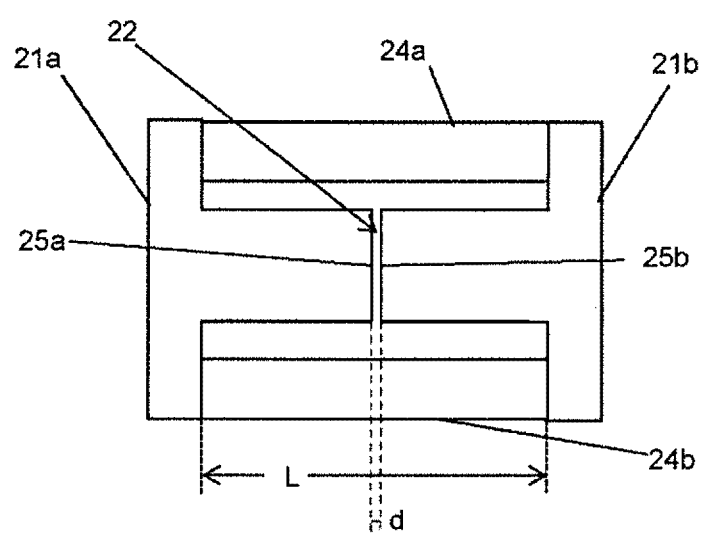

FIGS. 2A and B show an exemplary construction for such a filter. FIG. 2A is a perspective view, and FIG. 2B is a plan view. The filter has two optical elements 21a, 21b, with an air gap 22 between them. Each optical element has a reflective surface 25a,b on the end facing the air gap, so that the air gap forms an FP etalon (the reflective surface may be provided by any suitable treatment). The optical elements are shown as cylindrical elements formed integrally with plates, but may be any suitable shape such as rectangular, for example. The optical elements 21a, 21b are separated by expansion sections 24a, 24b.

The optical elements are formed from a material (the "optical material") which is transparent at the target filter wavelengths. The expansion elements are formed from a material (the "expansion material") having a linear coefficient of thermal expansion (LCE) which is greater than that the LCE of the optical material.

The length of the expansion elements between the locations where they attach to the optical elements is given by $L=L_0+\Delta L=L_0+\alpha L_0\Delta T$, where $L_0$ is the length at a reference temperature (e.g. 20° C.), and $\Delta T$ is the difference between the current temperature of the expanding material and that reference temperature.

The distance, d, between the reflective surfaces 25a,b is given by $L-2C$, where C is the length of each of the cylinders (or, for other constructions, the length between the reflective surface and the attachment of the expansion element to the optical element).

$$d=L-2C=(L_0+\Delta L)-2(C_0+\Delta C)=(L_0+\alpha_L L_0\Delta T)-2(C_0+\alpha_C C_0\Delta T)=d_0+\Delta T(\alpha_L L-2\alpha_C C_0)$$

assuming that the cylinders and expanding material are the same temperature, where $\alpha_L$ and $\alpha_C$ are the coefficients of linear expansion of the expanding material and the optical material, respectively. If $\alpha_L \gg \alpha_C$, this simplifies to $d=d_0+\Delta d=d_0+\alpha_L L\Delta T$. As can be seen, the term controlling the variation in d with temperature ($\alpha_L L_0 \Delta T$) is directly proportional to the initial length $L_0$ of the expansion elements, and independent of the initial value of d, and so there is no longer a trade-off between FSR (requiring smaller d) and the range of tuning.

The length $L_o$ is greater than the distance between the reflective surfaces, $d_0$, and may be much greater, e.g. at least an order of magnitude greater than d (i.e. at least ten times d). For example, the distance $d_o$ may be 20 to 30 microns, and the length $L_0$ may be 2 to 3 millimetres.

As an alternative, the linear coefficient of expansion of the "expansion elements" may be less than the linear coefficient of expansion of the optical elements. In this case, the expansion of the optical elements will cause the distance d to be reduced, and an increase in temperature will result in a reduction in d. The above equations still apply. Where the linear coefficient of expansion of the expansion elements is much less than the CLE of the optical elements, the expansion elements effectively act as rigid "struts" or supports, and the expansion of the optical elements is the primary contributor to the change in d. In order for d to be adjustable, the linear coefficient of expansion of the expansion elements and optical elements should be different.

As an example, to achieve continuous tuning over the C-band with a temperature change of 40-50° C., the coefficient of linear expansion of the expansion material may be between 7 and 12 parts per million per ° C. (ppm/° C.) for expansion element lengths of 1-2 mm (typically 1.5 mm). Where the coefficient of linear expansion of the optical material is significant (e.g. >0.5 ppm), the difference between the coefficient of linear expansion of the expansion material and the coefficient of linear expansion of the optical material may be between 7 and 12 parts per million per ° C. (ppm/° C.). For longer expansion elements, the coefficients of linear expansion may be reduced proportionately (and raised for shorter expansion elements).

The temperature of the expansion elements (and/or optical elements) can be controlled by any suitable means, e.g. by resistance heating (either integrated into the expansion elements 24a,b, as a film bonded to the expansion elements, or using the expansion material itself as a resistance) or coupling to a thermo-electric cooler. The temperature range of the expansion and/or optical elements may typically be 0° C. to 150° C. or possibly a narrower range such as 20° C. to 100° C. The temperature range of the expansion elements may cause an expansion or contraction in d of at least half the wavelength or at least a wavelength of the desired optical signal. The temperature of the device may be measured by any suitable means, such as a thermistor. Alternatively, only the applied heating/cooling power may be measured, and the temperature determined from that.

The distance d depends on the absolute temperature of the expansion elements (or optical elements, if they have a higher linear coefficient of expansion). As such, the filter control must take ambient temperature into account. This can be done by controlling the temperature of the expansion elements from a direct temperature measurement of the elements, or by providing a constant ambient temperature using e.g. a thermo-electric cooler mounted to the base on which the filter sits.

Figure 3:
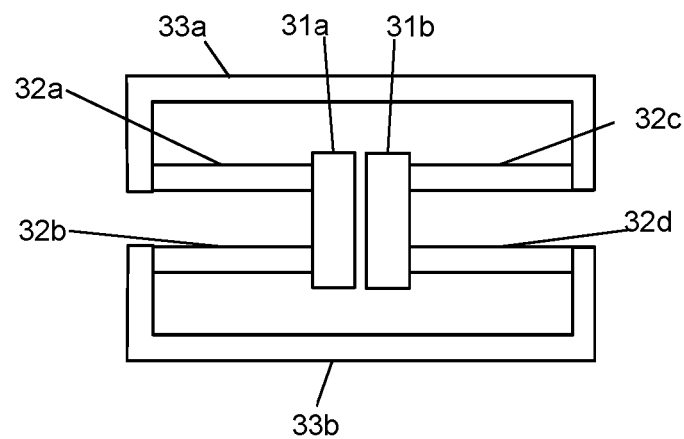
FIG. 3 shows an alternative exemplary construction.

FIG. 3 shows an alternative construction which removes the effect of ambient temperature. This construction has two optical elements 31a, 31b (made from an optical material) each of which is connected to respective inner expansion elements 32 a-d made from a first expansion material. The inner expansion elements on each side are connected to an outer expansion element 33a, 33b made from a second expansion material. The inner and outer expansion elements are arranged such that expansion of the inner expansion elements will cause a reduction in d, and expansion of the outer expansion elements will cause an increase in d. The first and second expansion materials are chosen to ensure that $2(\alpha_1 L1 + \alpha_c C) = \alpha_2 L2$, where $\alpha_1$ is the LCE of the first expansion material, L1 is the length of each inner expansion element, $\alpha_2$ is the LCE of the second expansion material, and L2 is the length of each outer expansion element. As before, if $\alpha_1, \alpha_2 \gg \alpha_C$ contributions from the expansion of the optical material can be ignored. The distance between the optical elements is then given by:

$$\begin{aligned} d &= L2 - 2(L1 + C) \\ &= (L2_0 + \Delta L2) - 2(L1_0 + \Delta L1 + C) \\ &= (L2_0 + \alpha_2 L2_0 \Delta T2) - 2(L2_0 + \alpha_1 L1_0 \Delta T1 + C) \\ &= d_0 + \alpha_2 L2_0 \Delta T2 - 2\alpha_1 L1_0 \Delta T1 \\ &= d_0 + \alpha_1 L1_0 (\Delta T1 - \Delta T2) \\ &= d_0 + \alpha_1 L1_0 (T1 - T2) \end{aligned}$$

where T1 is the temperature of the inner expansion element, and T2 is the temperature of the outer expansion element. d is therefore only dependent on the difference in temperatures between the inner and outer expansion elements, which can be relatively easily controlled without taking into account the ambient temperature, e.g. by independent heaters on each of the inner and outer expansion elements.

Figure 4:
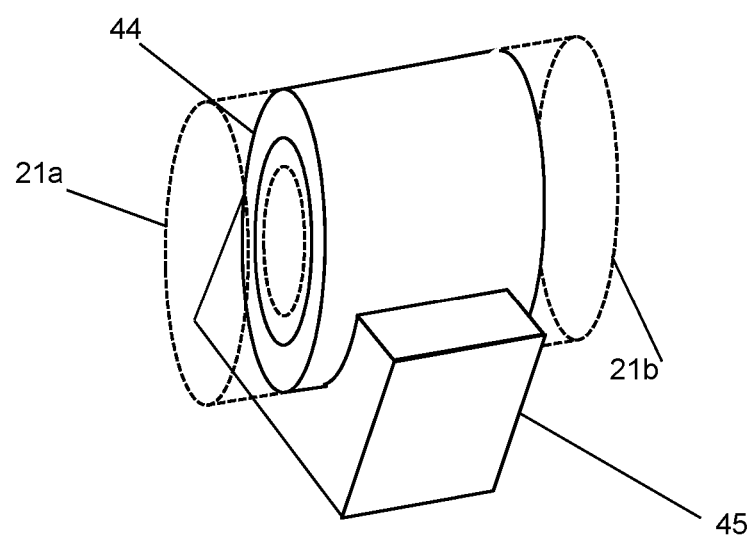
FIG. 4 shows a further alternative exemplary construction.

As well as the structure shown in FIG. 2A, the filter may be constructed with cylindrical symmetry around the axes of the optical elements, e.g. as shown in FIG. 4. The expansion element 44 is annular in cross section, and the optical elements 21a, b are partly located within the bore and connected to the expansion element 44 on either end. A similar cylindrically symmetric structure may be constructed with the cross section shown in FIG. 3.

The filter may be mounted in a stand, 45, on which the expansion element sits. The stand 45 may be made from the expansion material or a material with similar thermal expansion characteristics (e.g. no more than 5% difference in linear coefficient of thermal expansion, or no more than 1% difference), to avoid strain resulting from differing expansion of the stand 45 and expansion element 44. In this case, the stand may be configured such that it is only in contact with the expansion elements. Alternatively, the stand may be made from the optical material or a material with similar thermal expansion characteristics. Through testing, it has emerged that the former approach performs better for filters with a single expansion element (e.g. the filter of FIG. 4) and the latter approach performs better for filters with multiple expansion elements (e.g. the filter of FIG. 2A). However, either approach is an improvement over the use of a stand which is not matched to either material.

To reduce heat transfer from the stand to external components, the stand may be mounted on standoffs made from a thermally insulating material, e.g. glass or silica. A stand may be used with any filter construction—in the case where there are multiple expansion materials used (e.g. a construction according to FIG. 3), the stand may be made from the expansion material which it is in contact with.

The loss caused by the filter is dependent on the alignment of the reflective surfaces of the optical elements, as shown by FIGS. 5A and B. FIG. 5A is a graph of transmission for a perfectly aligned etalon. FIG. 5B is a graph of transmission for an etalon where the reflective surfaces of the optical elements are misaligned by 0.005° (18 arc seconds, all other properties are the same in both simulations). As can be seen, the perfectly aligned etalon has a transmission peak very close to 1, and the misaligned etalon has a transmission peak of around 0.9 even at a very small misalignment.

Expansion of the expansion elements will cause stresses in the filter. This is because, where the expansion material joins the optical material, each material is expanding at a different rate. This effect can be mitigated by providing an elastic layer (e.g a low modulus resin, for example with a modulus less than $10^8$ newtons/meter (N/M), or about $10^7$ N/M) in between the optical material and the expansion material, to absorb the stresses. As shown in FIG. 6, in order to ensure that the filter remains aligned, non-elastic spacing elements 61 may be placed within the elastic material 62 such that they maintain the distance between the optical material 63 and the expansion material 64. Such spacing elements may be spheres of small radius, e.g. up to 30 microns. The spacing elements maintain the distance between the optical material and expansion material, but since they are not directly attached to either material they do not cause stresses to build up.

The stresses can be further reduced by limiting the contact area between the expansion material and the optical material, as shown in FIGS. 7A, B and C, e.g. by providing a reduced cross section of the expanding elements 71a,b,c close to the point at which they abut the optical elements 72a,b,c. In the examples shown an elastic layer 73a,b,c is again shown at the point of abutment. This also allows the expanding elements to flex slightly in the regions with reduced cross section. The elastic layer 73a,b,c may be used to fill the resulting space in the expanding element, as shown in FIG. 7C As an alternative to the use of elastic material, the join between the optical sections and expansion sections may be arranged to permit some slipping in directions perpendicular to the optical axis of the FP etalon. This may be achieved e.g. by providing an applied force parallel to the axis which maintains intimate contact at the abutted surfaces. The force may be applied by e.g. a spring, or it can be provided by having the two surfaces in intimate contact such that Van der Waals forces between the surfaces will form a bond. For the Van der Waals forces to be sufficiently strong, the surfaces must be close to ideally flat, and the gap between them must be close to or smaller than a wavelength.

Figure 8A:
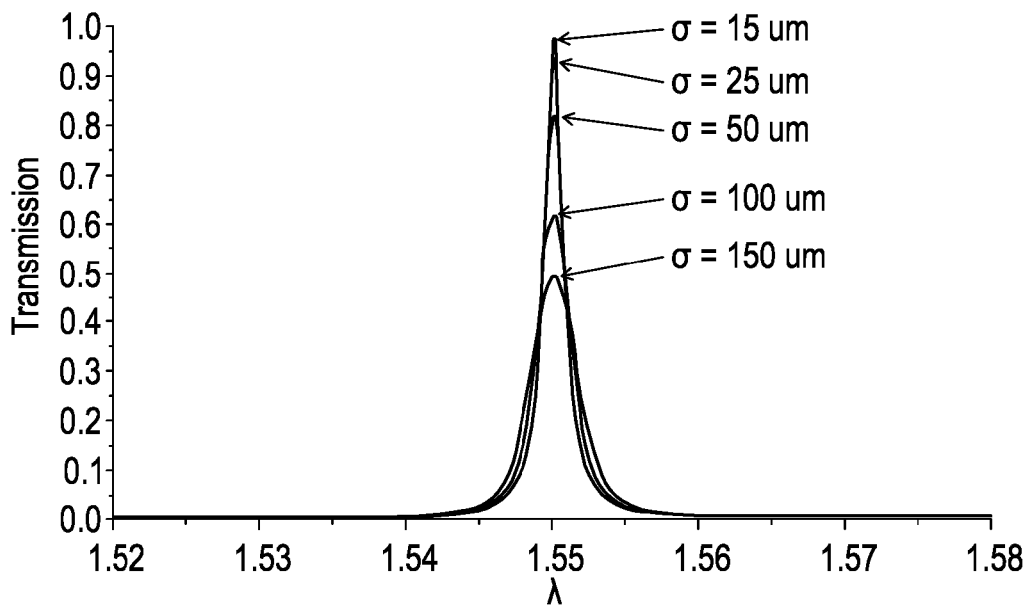
FIG. 8A shows simulated transmission curves for a misaligned optical filter.
Figure 8B:
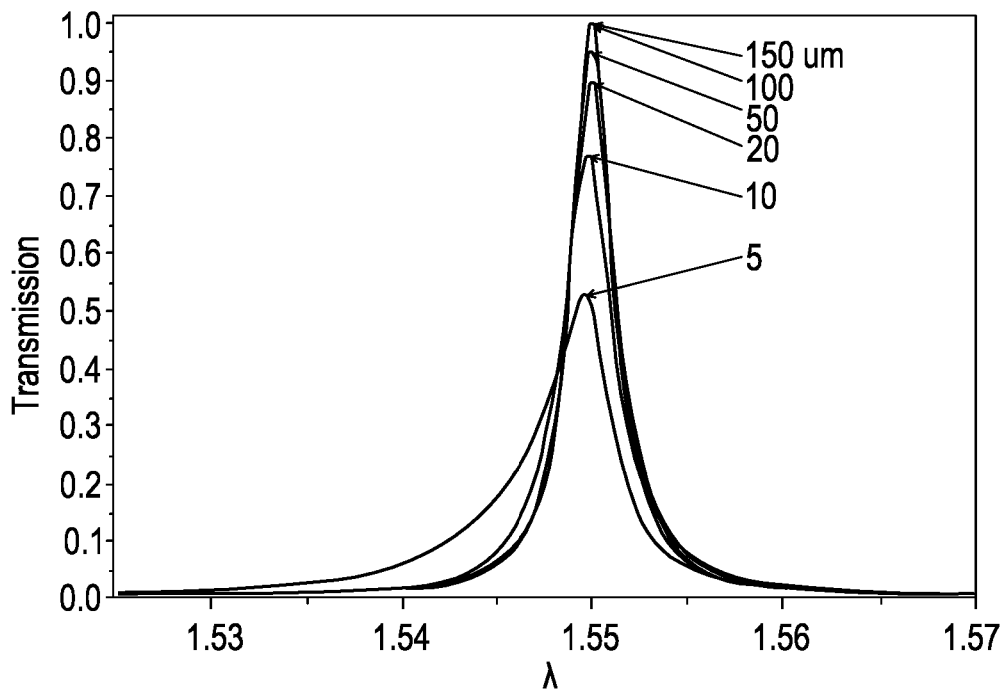
FIG. 8B shows simulated transmission curves for an optical filter, taking diffraction into account.
Figure 9A:
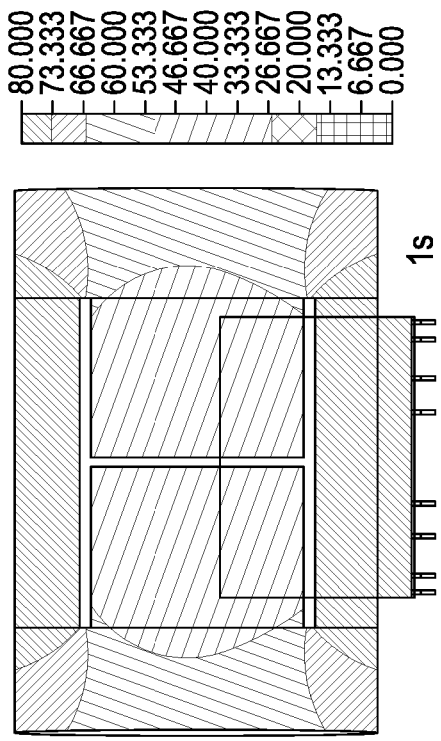
FIGS. 9A to 9D show thermal simulations of an exemplary optical filter.
Figure 9B:
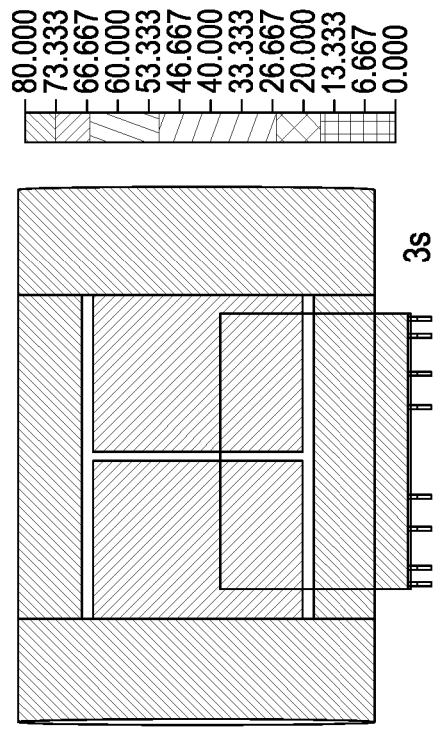
Figure 9C:
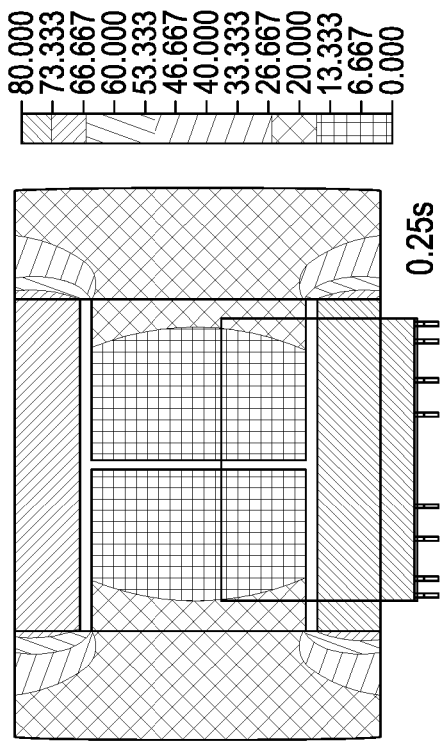
Figure 9D:
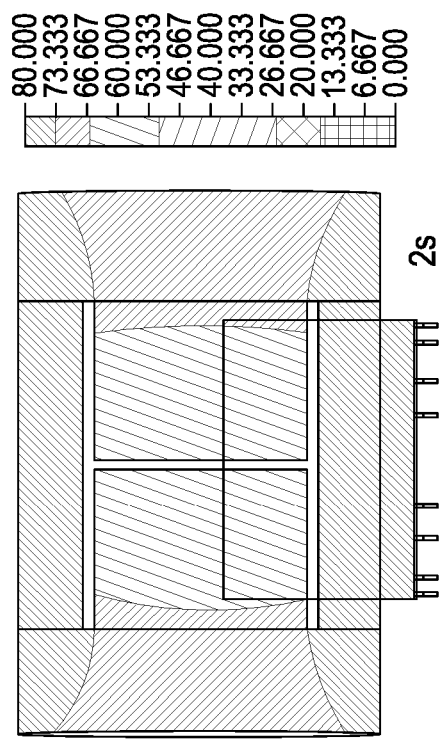

The losses due to misalignment can be further mitigated by reducing the width of the beam passing through the filter. A narrower beam will experience smaller losses from a misaligned filter, as shown in FIG. 8A, which shows simulated transmission for beams of 15 to 150 micron width for a 0.005° (18 arc seconds) misalignment. However, narrow beams experience higher losses due to diffraction effects meaning that the beam does not remain well collimated (whether or not the mirrors are aligned). This is shown for beams of 5 to 150 micron width in FIG. 8B. As such, a balance is required between the desire for a narrower beam to avoid misalignment losses and a wider beam to avoid diffraction. Depending on the alignment which can be achieved and the requirements of the filter application, beam widths between 5 and 150 microns may be suitable. It would of course be possible to use standard quality control procedures to separate out well aligned filters for use in wider beam applications, and less well aligned filters for use in narrower beam applications.

Control and calibration of the filter can be achieved in several ways. The filter may be pre-calibrated and the temperature control configured to vary the temperature of the expansion elements according to that calibration. Alternatively, active calibration may be employed by providing a detector after the FP etalon. This detector can be used to measure the intensity of the transmitted light, and a feedback loop can then be implemented to ensure that the filter is centred on the primary mode of the input.

One possible feedback scheme would be to add modulation to the thermal control, e.g. adding a dither (e.g. sine wave) variation to the temperature of small magnitude and with a frequency lower than the thermal response of the expansion material (e.g. 20 Hz). This modulation can then be used to determine the location of the transmittance (intensity) peak using standard methods.

Alternatively, a second detector may be placed before the FP etalon, and the readings of the two detectors compared to determine the loss through the filter. If the loss exceeds a threshold, then the temperature may be adjusted to return to the peak transmittance. However, this method does not allow determination of whether the temperature is too high or too low, so a secondary process is required to find the peak. For example, the temperature might be adjusted upward when the loss exceeds a threshold. If the loss is reduced by this movement, then the temperature is adjusted upwards further until the peak is found. If the loss is not reduced by the initial upwards movement, but instead is increased, then the temperature is adjusted downwards until the peak is found.

As a third alternative, a secondary beam having a wavelength within the shoulders of the transmittance peak of the FP etalon may be used. The secondary beam is arranged to pass through the filter at a different angle to the primary beam (either in the same direction as the primary beam, or "backwards" in comparison to the primary beam), and the ratio of the intensity of the primary beam and the secondary beam after they have passed through the filter is measured. Since this gives 2 points of known wavelength and intensity on the slope leading to the peak, the ratio of these two intensities can be used to find the peak transmittance.

Any of the above active calibration methods may be performed on a continuous basis, in response to the intensity dropping below a threshold or the loss exceeding a threshold, or on a periodic basis.

The thermal conductivity of the expansion material and the optical material will determine how quickly the filter can respond to temperature changes. In general, the filter will not be at optimum calibration until the expansion material and optical material are at equilibrium, as the thermal expansion of the optical material will cause small changes in the distance d. This can be mitigated by selecting an expansion material with a much greater coefficient of linear thermal expansion than that of the optical material, and an expansion material with a high thermal conductivity. Particularly suitable expansion materials include ceramics, glasses, and metals, particularly copper, aluminium, or stainless steel. The optical material should be selected for low coefficient of thermal expansion and high thermal conductivity. One possible example is silica. FIGS. 9A to 9D show thermal simulations of a filter according to the design in FIG. 4 which is approximately 3 mm long where the expansion material was copper and the optical material was silica. As can be seen, the expansion material reaches thermal equilibrium very quickly (within the first 0.25 s), but the optical material takes relatively longer (about 3 s).

In the alternative construction where the LCE of the expansion material is less than that of the optical material, the expansion material should be selected to have a low LCE, and the optical material to have a high LCE. Suitable materials for the expansion material in this construction include silica, invar, or Zerodur®. Suitable materials for the optical material include BK7 glass. As before, both materials should have a high thermal conductivity.

In order to prevent back reflections from or within the etalon, the surfaces of the optical elements opposite the reflective surfaces may be at an angle to the reflective surfaces, and the beam to be filtered may be provided at a slight angle to the axis perpendicular to the reflective surfaces. In each case, a small angle (e.g. less than 1 degree) is sufficient.

Thus embodiments of the invention provide for the use of an expanding material which will control the etalon cavity width in order to tune the filter peak over frequency. The expanding material is a length exceeding the cavity width and is a structure which is arranged outside the resonator optical path and resonator mirrors. The temperature of the thermally expanding material and the optical resonator may be controlled. The expanding material may be metal or ceramic or glass or other material which has larger expansivity than the material comprising the resonator structure. The resonator mirror optical parts may be bonded to the thermally expanding material in such a way as to maintain the parallelism of the resonator gap to achieve high finesse and low loss at the resonance frequency. The bond may comprise surface to surface contact or an intermediate material which allows the stress between the differentially expanding materials to be minimised. The contact may be designed to slip by means of close contact or by an applied force which maintains intimate contact between the bond surfaces or it may be designed to include a thin layer of low elastic modulus material which may be partially filled with particles designed to maintain a defined thickness. The resonator may be bonded to a surface with a low elastic modulus material to minimise stresses to the filter structure over temperature variations. The temperature of the etalon may be changed by means of a thermo-electric cooler or by a resistive heater. The temperature of the etalon may be controlled by means of a proximate temperature sensitive device such as a thermistor.

The invention claimed is:

1. An optical filter comprising:
   a first optical element;
   a second optical element,
      the first optical element and the second optical element being arranged along a common axis, and
      the first optical element and the second optical element each terminating in a respective flat surface perpendicular to the common axis,
      the respective flat surfaces being separated by a gap between the first optical element and the second optical element such that the respective flat surfaces form a Fabry-Perot etalon and light is transmittable along an optical path through the first optical element, the second optical element, and the Fabry-Perot etalon; and
   one or more expansion elements located outside the optical path and extending parallel to the common axis with a length, along the common axis, greater than a width of the gap,
      the one or more expansion elements comprising a material having a linear thermal coefficient of expansion different than that of the first optical element and the second optical element such that a difference in expansion of the one or more expansion elements and the first optical element and the second optical element causes relative movement of the respective flat surfaces along the common axis, resulting in a change in the width of the gap,
the one or more expansion elements including a first set of expansion elements and a second set of expansion elements, and
expansion of the first set of expansion elements causing an increase in the width of the gap and expansion of the second set of expansion elements causing a decrease in the width of the gap.

2. The optical filter of claim 1, further comprising:
a temperature control mechanism to control a temperature of at least one of the one or more expansion elements, the first optical element, or the second optical element.

3. The optical filter of claim 2, wherein the temperature control mechanism comprises a resistance heater or a thermo-electric cooler.

4. The optical filter of claim 2, further comprising:
a detector to measure an intensity of light transmitted by the optical filter,
the temperature control mechanism being to control the temperature based on information received from the detector.

5. The optical filter of claim 2, wherein the temperature control mechanism is to vary the temperature continuously over a particular range to cause the width of the gap to vary by a distance corresponding to a wavelength transmitted by the optical filter.

6. The optical filter of claim 1, wherein a temperature control mechanism is to control a temperature of the first set of expansion elements and the second set of expansion elements independently.

7. The optical filter of claim 1, wherein the first set of expansion elements and the second set of expansion elements are arranged such that the width of the gap depends on a difference in a temperature between the first set of expansion elements and the second set of expansion elements and is substantially independent of an ambient temperature.

8. The optical filter of claim 1, wherein the one or more expansion elements, the first set of expansion elements, and the second set of expansion elements are in contact with each other.

9. The optical filter of claim 1, further comprising:
a controller to cause a temperature of the optical filter to be adjusted such that a particular distance is set to a value which causes a peak of a transmission of the optical filter to be at an output frequency of a modulator associated with the optical filter.

10. The optical filter of claim 1, wherein:
the first set of expansion elements comprises a first expansion material,
the second set of expansion elements comprises a second expansion material, and
the first expansion material has a first coefficient of thermal expansion that is different from a second coefficient of thermal expansion of the second expansion material.

11. An optical filter comprising:
a first optical element;
a second optical element,
the first optical element and the second optical element being arranged along a common axis, and
the first optical element and the second optical element each terminating in a respective flat surface perpendicular to the common axis,
the respective flat surfaces being separated by a gap between the first optical element and the second optical element such that the respective flat surfaces form a Fabry-Perot etalon; and
one or more expansion elements extending parallel to the common axis with a length, along the common axis, greater than a width of the gap,
the one or more expansion elements comprising a material having a linear thermal coefficient of expansion different than that of the first optical element and the second optical element,
the one or more expansion elements including a first set of expansion elements and a second set of expansion elements, and
expansion of the first set of expansion elements causing an increase in the width of the gap and expansion of the second set of expansion elements causing a decrease in the width of the gap.

12. The optical filter of claim 11, further comprising:
a temperature control mechanism to control a temperature of at least one of the one or more expansion elements, the first optical element, or the second optical element.

13. The optical filter of claim 12, wherein the temperature control mechanism comprises a resistance heater or a thermo-electric cooler.

14. The optical filter of claim 12, further comprising:
a detector to measure an intensity of light transmitted by the optical filter,
the temperature control mechanism being to control the temperature based on information received from the detector.

15. The optical filter of claim 12, wherein the temperature control mechanism is to vary the temperature continuously over a particular range to cause the width of the gap to vary by a distance corresponding to a wavelength transmitted by the optical filter.

16. The optical filter of claim 11, wherein a temperature control mechanism is to control a temperature of the first set of expansion elements and the second set of expansion elements independently.

17. The optical filter of claim 11, wherein the first set of expansion elements and the second set of expansion elements are arranged such that the width of the gap depends on a difference in a temperature between the first set of expansion elements and the second set of expansion elements and is substantially independent of an ambient temperature.

18. The optical filter of claim 11, wherein the one or more expansion elements, the first set of expansion elements, and the second set of expansion elements are in contact with each other.

19. The optical filter of claim 11, further comprising:
a controller to cause a temperature of the optical filter to be adjusted such that a particular distance is set to a value which causes a peak of a transmission of the optical filter to be at an output frequency of a modulator associated with the optical filter.

20. The optical filter of claim 11, wherein a difference in expansion of the one or more expansion elements and the first optical element and the second optical element causes relative movement of the respective flat surfaces along the common axis, resulting in a change in the width of the gap.

* * * * *